United States Patent [19]

Fain

[11] Patent Number: 5,323,142
[45] Date of Patent: Jun. 21, 1994

[54] ACCESSORY FOR DETECTING LEAKING OF SAFETY VALVES

[75] Inventor: John E. Fain, Pineville, La.

[73] Assignee: Dresser Industries, Inc., Dallas, Tex.

[21] Appl. No.: 731,494

[22] Filed: Jul. 17, 1991

[51] Int. Cl.$^5$ .............................................. G08B 21/00
[52] U.S. Cl. .................................... 340/605; 137/554; 251/129.01
[58] Field of Search ........................ 340/603, 605, 635; 137/554, 553; 73/40; 251/129.01, 129.02

[56] References Cited

U.S. PATENT DOCUMENTS

| | | | |
|---|---|---|---|
| 3,896,850 | 7/1975 | Waltrip | 137/554 |
| 4,342,988 | 8/1982 | Thompson et al. | 340/679 |
| 4,569,365 | 2/1986 | Namand et al. | 137/554 |
| 4,658,856 | 4/1987 | Gonzi | 137/543.23 |
| 4,678,160 | 7/1987 | Yamada et al. | 251/129.02 |
| 4,818,976 | 4/1989 | Schmitt et al. | 340/605 |
| 5,109,885 | 5/1992 | Tauscher | 137/554 |

FOREIGN PATENT DOCUMENTS

WO90/05845  5/1990  PCT Int'l Appl.

Primary Examiner—Jeffery A. Hofsass
Attorney, Agent, or Firm—Hubbard, Tucker & Harris

[57] ABSTRACT

An accessory for detecting leaking and flowing conditions in safety valves and safety relief valves utilizes a load sensing device to sense a change in a load on the valve of the safety relief valve caused by a displacement of the valve disc and provides a low-voltage output signal indicating the nature of the load change.

10 Claims, 1 Drawing Sheet

ACCESSORY FOR DETECTING LEAKING OF SAFETY VALVES

FIELD OF THE INVENTION

The invention pertains generally to safety valves and safety relief valves, and more particularly to apparatus and methods for sensing leaking and flowing conditions in safety valves and safety relief valves.

BACKGROUND OF THE INVENTION

"Safety valves" and "safety relief valves" (also referred to herein as simply "valve" or "valves") monitor and relieve abnormal or dangerously high pressures in systems that handle, generate, store, contain, confine, carry, transfer or transport pressurized fluid (material in liquid or gaseous states). Under normal operating pressures, the valves remain closed and sealed. When the pressure of the fluid exceeds a predetermined maximum system pressure, the valve opens to dispel fluid and thereby relieve pressure. When installed, a valve is in direct contact with the pressurized fluid. The pressure of the fluid applies a force to the surface of the valve's disc. To resist the normal pressure of the fluid, the valve disc is "loaded" to create an opposing force to the pressure force of the fluid. The load forces the valve disc into a valve seat and thereby creates a seal. The load is adjusted to set a force equal to a predetermined maximum system pressure so that the valve disc is displaced or "lifted" from the seat and the seal broken to allow fluid to flow only when the system pressure exceeds the allowed maximum system pressure.

There are a variety of methods for operating a safety valve or a safety relief valve. Some are purely mechanical; some are electro-mechanical or magnetic. Under codes of the American Society of Mechanical Engineers (ASME), all are required to have a purely mechanical method of loading the valve for at least backing up the operation of the valve. The common, industry-wide method involves loading the valve with a force generated by a compressed spring.

Safety valves and safety relief valves are used in an enormous variety of situations, wherever there exists danger from over-pressurized fluid. Safety valves are used with systems such as boilers and steam generators, and safety relief valves are used in systems such as manufacturing processes, pipes for transferring or transporting fluids, and other types of vessels, containers or channels for carrying or storing fluid under pressure. In addition to their construction, use and operation of safety valves and safety relief valves are mandated and regulated by industry and, sometimes, government guidelines that generally follow or adopt the American Society of Mechanical Engineers (ASME) code, particularly Sections 1 (for safety valves) and 8 (for safety relief valves).

Knowledge of whether a valve is leaking or flowing is important. A flowing condition indicates that the system has been over-pressurized, possibly requiring any number of actions such as shutting down the system to avoid or to mitigate damage. A leaking condition may indicate one of two possibilities. First, a leak may result from the system being operated close to the relief point. Detection of leaking thus serves as warning to take corrective action to reduce pressures before fluid is relieved. Second, a valve that leaks may be defective or malfunctioning, requiring service or replacement. Further, where fluid leaks out of the system, product—and money—is unnecessarily lost.

Aside from actually witnessing a fluid escaping from a valve, monitoring the volume of fluid in a system may be the simplest method for knowing whether a safety valve or safety relief valve is leaking or flowing. Where, however, multiple numbers of safety valves or safety relief valves are installed in a system, each set at the same pressure point, it becomes impossible to isolate which valve is leaking. Without being able to detect which valve is leaking, all the valves must be serviced or replaced. Therefore, a leak detection mechanism is desirable.

A leak and flowing detection mechanism is also desirable in automated production facilities or anywhere valves have been remotely installed, such as modern petroleum refineries and petrochemical plants that are operated from remotely located control centers for reasons of safety and economy. Opening of a safety relief valve may be the only way of discovering or monitoring unsafe pressure conditions. Safety and safety relief valves for these facilities are, ideally, equipped with transducers for detecting the opening of a safety relief valve and communicating the detection to the central control center. As fluids handled in these facilities are often volatile, the transducers, as well as the system for communicating the transducer output to a central monitoring station, use very low voltages to reduce the risk of sparks that might ignite the fluid.

For many years, the preferred method of detecting valve openings caused by excessive fluid pressure have been switch devices such as so-called micro-switches. Switches are mechanically coupled to a moving part of the valve, usually the rod-like spindle or valve stem, that moves or is "lifted" with a linear displacement of the valve disc along the axis of the spindle. These switches have proven to be unsatisfactory in the illustrated situations for several reasons. The switches have a substantial "dead zone" between an open contact and a closed contact position, making them difficult to adjust to detect small spindle movements characteristic of leaking. If installed in the valve in positions at which they may be able to detect small movements in the spindle characteristic, a full lift condition will damage them. Therefore, when installed so that they are not damaged, substantial movement of the spindle is required before being actuated or switched, making them suitable only for detecting flowing conditions in the valve when the valve is at or near "full lift". The switches require relatively high-voltages, making them unsuitable for applications in which voltages in the sensor must be kept low. They are cumbersome to set or adjust in the field as they tend to be intricate. Once set, the switches tend to be easily tampered with and easily become misadjusted by mechanical vibrations common to many applications. Even if they do retain their proper settings, the shock of a release with full-lift of the valve disc frequently damages the switches. Finally, the switches are sensitive to the environment, requiring protective housings to be installed around the switching mechanism.

SUMMARY OF THE INVENTION

The invention concerns an improved safety valve or safety relief valve having a mechanism for detecting displacement of valves in both leaking and flowing conditions. Coupled to a part of the safety relief valve that moves with the displacement of the valve disc is a load that varies with the displacement of a moving part in the valve. As the moving part is displaced in response to the opening of the valve, a load greater than a starting load is applied to a load sensing device. The load registered by the load sensing device is monitored: small fluctuations in the applied load indicate leaking; a large change in the load indicates flowing.

Various aspects of the invention are best illustrated by reference to the preferred embodiment of the invention in a standard safety relief valve. A valve stem or spindle is coupled to the valve disc of the safety relief valve for linear axial movement. The spindle is loaded with a spring that applies, when fully compressed, a minimal force to the spindle that does not substantially interfere with the operation of the valve. Coupled between the spring and the spindle is a load cell. The load cell is sensitive enough to detect changes or fluctuations in force of the spring load due to small displacements or in the position of the spindle indicative of leaking. The load cell also has a range large enough to register loads at full lift without damage. The load cell provides a low-voltage output signal to an explosion proof connector for coupling to a gauge or meter, or to a transmission, or communication system for transmission to a monitoring station or remote control center.

High voltage levels are not used, making the detection suitable for all applications, particular those requiring low voltages. The detection mechanism of the invention is very sturdy; it is not as susceptible to damage from or misadjustment caused by shocks or vibration; and it is easily adjustable and generally not sensitive to almost all environments in which it may be used. At least one embodiment of the detection mechanism is easily incorporated and adapted to most existing safety relief valves without substantial modification as the detection mechanism is mounted within standard-size caps enclosing moving parts of the valve. Incorporation of the detection apparatus therefore does not substantially add to the size of the safety relief valve, a benefit for installations where space is severely limited. The detection apparatus may in fact be an accessory for adding to a preexisting safety relief valve or providing as an option for new valves. Adaptability further permits, if desired, a universally calibrated spring and load cell to be installed on all valves within a system or facility, regardless of their size or type.

DETAILED DESCRIPTION OF THE DRAWINGS

Figure 1:
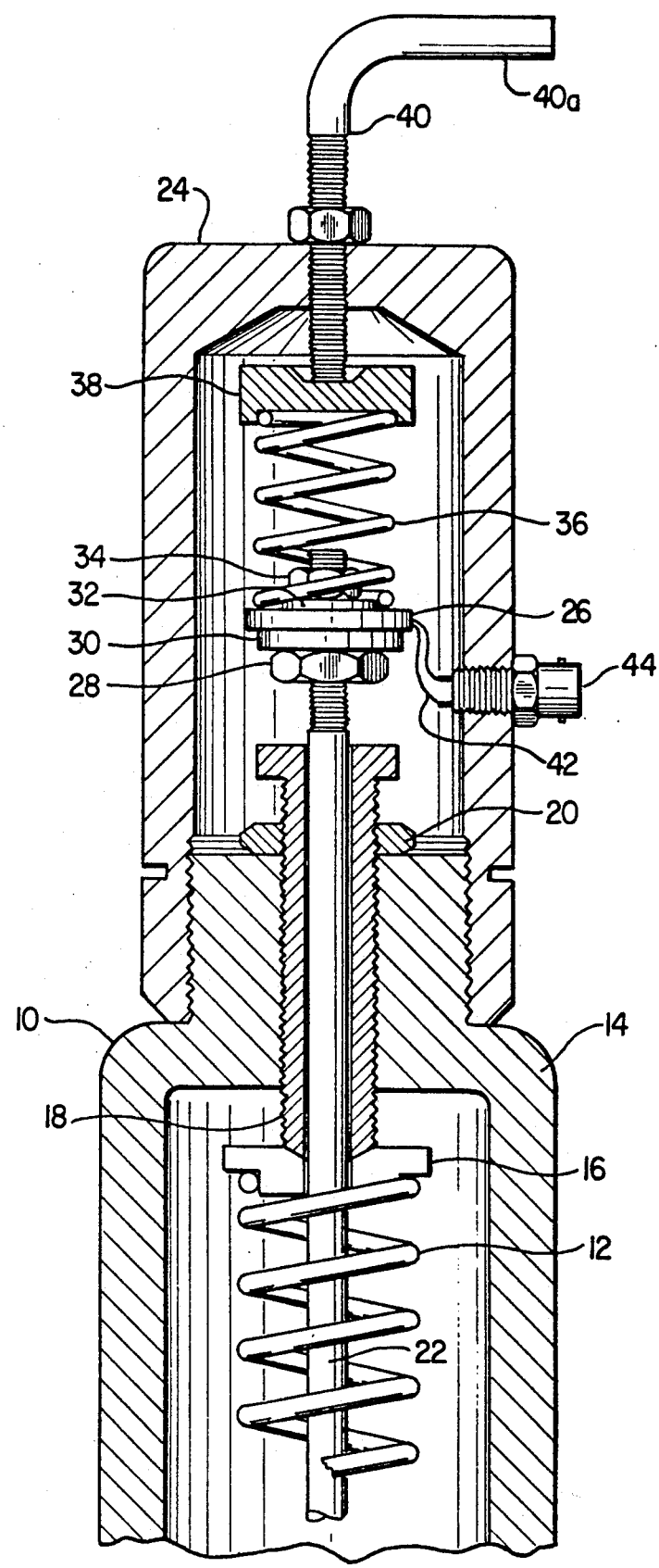
FIG. 1 is a side view of a cap of a safety relief valve shown with portions in section and other portions cutaway to display interior components in elevation.

Referring to FIG. 1, there is illustrated one embodiment of improved safety relief valve in accordance with the teachings of the invention and having a widely used standard configuration. The safety relief valve pictured is for explanation only. It is possible to improve safety valves of differing configurations and operation in accordance with the present invention. A typical safety valve or safety relief valve 10 includes a valve disc, not shown, against which fluid under pressure in a system to which the safety relief valve is coupled acts. When closed, the valve disc sits snugly on a valve disc seat to form a seal. Displacement of the valve with respect to the valve seat allows fluid to flow through the valve. The force of fluid under pressure acts against the valve in a manner tending to cause its displacement and breaking of the seal.

To keep the valve closed and properly sealed under normal operating pressures of the fluid an opposing force is applied to the valve disc with a load. In most applications, the loading mechanism is that shown: a compressed spiral spring 12 enclosed within bonnet 14. One end of the load spring 12 is mechanically coupled to the valve and exerts a force acting on the valve sufficient to seal the valve under normal operating pressures of the fluid. The other end of the compressed load spring is mechanically coupled to bonnet 14 for bearing the force of the compressed spring. The spring 12 rests against upper spring washer 16. Washer 16 is connected to screw 18. Screw 18 is mounted to the bonnet through a threaded hole in bonnet 14. The compression of the spring is set by screwing the screw in and out of the bonnet to adjust the position of the washer and locking the screw into place by nut 20.

Extending along an axis of compression of the spiral spring 12 and slidably guided through washer 16, screw 18 and nut 20 is a valve stem or spindle 22. The valve stem is operatively coupled to the valve disc (not shown). The spindle 22, cooperating with the screw 18, moves linearly with the valve disc in a direction coaxial with the axis formed by the spindle and the force exerted by load spring 12. In the art, the movement of the valve disc and the spindle is referred to as "lifting".

A removable cap 24, screwed on to the top of bonnet 14, encloses the portion of the spindle protruding from the top of bonnet 14 and load adjustment screw 18 and lock nut 20. An upper portion of spindle 22 is threaded where it protrudes from load adjustment screw 18. Supported on the spindle with lift nut 28 and washer 30 is a donut-shaped load cell 26 that is loosely retained for freedom of slip movement by flat washer 32 and lock nut 34. The load cell senses and translates a force applied to it into a self-generated low voltage signal on a level of millivolts. Any number of commercially available load cells are suitable, with preference to those with low voltage outputs, good sensitivity to very small loads such as those measured in inch/pounds of force, and relatively linear operation over predefined ranges.

Resting against an upper surface of the load cell 26, in full contact with it, is a bottom section spiral spring 36. The force of spring 36, when compressed between a displaced spindle 22 and upper spring washer 38, acts against the load cell 26 to create a load related to the displacement of the spindle. The spring 36 may be biased so that both the spring and the load cell 26 operate in their respective linear ranges and the output of the load cell is substantially proportionally or linearly related to the displacement of the spindle. Spring 36 is biased by adjusting the position of upper spring washer 38 with load adjustment screw 40 threaded through cap 24. The load adjustment screw is bent to provide a handle 40A for easy adjustment of the load on the load cell after installation. The spring 36 is generally of a type that applies a force under full compression that is a minimal or a small percentage of the force applied by spring 12 so as not to interfere with the pressure relief function of the valve. Ideally, the force exerted by spring 36 is in the range of inch/pounds. For accurate detection of lift, the spring is, again ideally but not necessarily, also linear over the range of compression necessary to measure the full range of lift of the spindle. To preserve accuracy over the life of the valve, spring 36 should be of high quality and of a type that will not relax when under compression.

Leads 42 from the load cell 26 transmit a low voltage signal representative of the load sensed by the load cell to an explosion proof electrical connector 44. A mating electrical connector, not shown, plugs into the electrical connector 44 and forms an explosion proof coupling to a low voltage signal transmission or communication system (not shown), if desired, or directly to a gage, meter, monitoring system or some other type of signal reading or display device.

In operation, load cell 26 and spring 36 are calibrated. Spring 36 is compressed so that the spring is biased to operate in its linear range, and so that the force exerted by the spring biases load cell 26 to operate within its linear range. A meter, gage, monitor or other type signal level reading device coupled to the output of the load cell through electrical connector 44 or through a signal transmission or communication system coupled to the connector is "nulled" when the valve is properly closed. The reading on the signal reading device is then calibrated to reflect displacement of the spindle. Several modes of operation are possible. For example, in one mode of operation the signal reading device may be calibrated to indicate the discrete states of "leaking" when small displacements or fluctuations of the spindle are detected, and "flowing" when the spindle is in full lift. In another possible mode of operation the signal reading device may continuously indicate the actual position of the spindle, from fully closed to fully lifted.

Where a large number of safety valves or safety relief valves are installed, calibration of all the valves may be simplified by using the same types of springs 36 and load cells 26 in each valve. All that is required for calibration is to bias properly the springs 36 to a predetermined load for each valve. Furthermore, where there is installed different types of valves, the leak and flow detection mechanism, namely the spring 36 and the load cell 26 in the preferred embodiment, is easily adapted to almost any type of safety relief valve or safety valve since it can be accommodated within existing caps 24 on most safety relief and safety valves. Use of the same type of spring 36 and load cell 26 further simplifies calibration for large facilities having various types of valves and/or pressure relief points.

Use of existing size caps also means that the detection mechanism can be an optional accessory for retrofitting already installed safety and safety relief valves, as well as for newly manufactured valves. Adaptability is further enhanced since taller caps are not required to accommodate the detection mechanism. Taller caps cannot be used in many installations because of limited or very tight space allowed for installation of the valves.

Although the preferred embodiments of the invention have been described in detail, it is to be understood that various changes, substitutions, modifications and alterations can be made therein without departing from the spirit and scope of the invention as defined by the appended claims.

What is claimed is:

1. An apparatus for detecting flow of material through a valve, the valve having a moving part, the moving part having a first position at which the valve is fully closed and a second position at which the valve is fully open; the apparatus comprising:
    load detection means for providing a signal representative of a force applied to the load detection means; and
    load generating means for coupling to the moving part of a valve, the load generating means exerting a force on the load detection means corresponding to the relative displacement of the moving part, the displacement of the moving part indicating opening of the valve, wherein the load generating means is comprised of a spring means coupled to a moving part, displacement of the moving part causing compressing in the spring means and wherein the load detection means is comprised of a load cell means and wherein the spring means generates a first load in response to a first displacement of the moving part from the first position which is small relative to the moving part's maximum displacement, at which first displacement leaking of fluid through the valve occurs, and wherein the load cell senses the first load indicating the first displacement.

2. The apparatus of claim 1 wherein the spring means further generates a second load in response to a second displacement of the moving part, which second displacement is near the moving part's maximum displacement at the second position, and at which second displacement the valve is fully open and fluid flows through the valve, and wherein the load cell means senses the second load indicating the second displacement.

3. The apparatus of claim 1 wherein the spring means is biased to operate to produce a force proportional to the displacement of the moving part, the force biasing the load cell means to provide a signal linearly representative of the force.

4. An apparatus for detecting a leaking condition in a valve and providing a signal indicating the leaking condition, the valve having a valve disc coupled to a spindle for linear movement along the spindle's axis and a compressed spring for generating a biasing force applied to the disc in the axial direction, the apparatus comprising:
    spring means operatively coupled to a spindle for compressing the spring means, the spring means generating a variable force dependent on the distance to which the spindle means compresses the spring means; and
    load cell means, the load cell means continuously receiving the variable force generated by the spring means and providing an output signal representative of the force.

5. A valve comprising:
    valve relief means, the valve relief means including:
        disc means, the linear displacement of which with respect to an orifice to a fluid handling system opens the orifice to permit fluid to flow therethrough;
        spindle means operatively coupled to the disc and displaced by displacement of the disc;
    spring means operatively coupled to a spindle means, the spindle means compressing the spring means when displaced, the spring means generating a force dependent on the displacement of the spindle means; and
    load cell means coupled to the spring means for continuously receiving the force generated by the spring means, the load cell providing an output signal representative of the force to a connector means for communicating the signal.

6. The valve of claim 5 wherein one end of the spring means is coupled to a cap and an opposite end of the spring means engages the load cell means, the load cell means being fixably coupled to the spindle means for linear movement that compresses the spring means.

7. A method for detecting leaking and flowing of a fluid through a valve, the method including the steps of:
generating a force corresponding to the relative displacement of the valve;
applying the force to a means for sensing the force;
generating with the means for sensing the force a signal representative of the force; and
relating the signal to predetermined signal parameters indicating displacements of the valve which are small relative to the valve's maximum displacement, but which permit fluid to leak through the valve.

8. The method for detecting leaking and flowing of a fluid through a valve of claim 7 wherein the step of generating a force corresponding to the relative displacement of the valve includes compressing a spring coupled to valve where the amount of compression of the spring is related to the amount of displacement.

9. The method of detecting leaking and flowing of a fluid through a valve of claim 8 wherein the step of applying the force to a means for sensing includes compressing the spring against a load cell means so that the force sensed by the load cell corresponds to the relative displacement.

10. The method of detecting leaking and flowing of a valve of claim 9 further including the step of biasing the spring to a bias force within its linear operating range, the bias force biasing the load cell means to operate in a linear range and thereby generate a signal proportional to forces generated by the spring.

* * * * *